United States Patent
Li

(10) Patent No.: US 12,387,482 B2
(45) Date of Patent: Aug. 12, 2025

(54) OBJECT RECOGNITION METHOD AND MOBILE TERMINAL

(71) Applicant: VIVO MOBILE COMMUNICATION CO., LTD., Chang'an Dongguan (CN)

(72) Inventor: Haojung Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 822 days.

(21) Appl. No.: 17/100,067

(22) Filed: Nov. 20, 2020

(65) Prior Publication Data

US 2021/0073541 A1 Mar. 11, 2021

Related U.S. Application Data

(63) Continuation of application No. PCT/CN2019/084500, filed on Apr. 26, 2019.

(30) Foreign Application Priority Data

May 22, 2018 (CN) .......................... 201810494006.7

(51) Int. Cl.
*G06K 9/00* (2022.01)
*G06F 1/3228* (2019.01)
(Continued)

(52) U.S. Cl.
CPC ............ *G06V 20/10* (2022.01); *G06F 1/3228* (2013.01); *G06F 1/3265* (2013.01); *G06F 1/3287* (2013.01); *H04N 23/651* (2023.01)

(58) Field of Classification Search
CPC .... H04N 23/651; H04N 23/667; H04N 23/65; H04N 23/61; G06F 1/3265; G06F 1/325;
(Continued)

(56) References Cited

U.S. PATENT DOCUMENTS 7,302,089 B1 * 11/2007 Smits ................ H04W 52/0251
   382/218
8,560,004 B1 * 10/2013 Tsvetkov .............. G06F 1/3215
   345/169

(Continued)

FOREIGN PATENT DOCUMENTS

CN 102148922 A 8/2011
CN 104331149 A 2/2015
(Continued)

OTHER PUBLICATIONS

Japanese Reasons for Refusal Office Actions related to JP Application No. 2020-564722 reported on Feb. 16, 2022.
(Continued)

*Primary Examiner* — Gregory A Morse
*Assistant Examiner* — Kevin M Coomber
(74) *Attorney, Agent, or Firm* — von Briesen & Roper, s.c.

(57) ABSTRACT

An object identification method and a mobile terminal are provided. The object identification method includes: capturing a scan object through the camera in a first operating state, in a case that a screen of the mobile terminal is turned off, to obtain a first capturing result; controlling the camera to enter a second operating state in a case that the scan object is determined to meet a preset condition according to the first capturing result, capturing the scan object through the camera in the second operating state to obtain a second capturing result, recognizing the scan object according to the second capturing result, and controlling the mobile terminal to turn on the screen to display a recognition result corresponding to the scan object.

7 Claims, 4 Drawing Sheets

(51) Int. Cl.
  *G06F 1/3234* (2019.01)
  *G06F 1/3287* (2019.01)
  *G06V 20/10* (2022.01)
  *H04N 23/65* (2023.01)
(58) Field of Classification Search
  CPC .... G06F 1/3296; G06F 1/3228; G06F 1/3287;
    G06F 1/3215; G06F 3/147; G06F 1/3278;
    H04M 1/72448; H04M 1/72484; G06V
    20/10; G06V 40/166; G06V 40/161;
    Y02D 10/00
  See application file for complete search history.

(56) References Cited

U.S. PATENT DOCUMENTS

| | | | | |
|---|---|---|---|---|
| 8,599,265 | B2 * | 12/2013 | Kim | H04N 23/651 |
| | | | | 348/69 |
| 11,416,062 | B2 * | 8/2022 | Ying | G09G 5/00 |
| 2008/0024644 | A1 | 1/2008 | Sugimoto | |
| 2010/0295988 | A1 | 11/2010 | Shimoda | |
| 2011/0134250 | A1 | 6/2011 | Kim | |
| 2012/0306742 | A1 | 12/2012 | Liu | |
| 2014/0122912 | A1 * | 5/2014 | Andou | G06F 1/3287 |
| | | | | 713/324 |
| 2016/0094814 | A1 * | 3/2016 | Gousev | H04N 23/61 |
| | | | | 348/143 |
| 2016/0337586 | A1 * | 11/2016 | Watanabe | H04N 23/63 |
| 2016/0379075 | A1 | 12/2016 | Ando | |
| 2017/0351908 | A1 * | 12/2017 | Wang | G06V 10/17 |
| 2018/0004275 | A1 | 1/2018 | Tubbs | |
| 2018/0373317 | A1 | 12/2018 | Ying et al. | |
| 2020/0272809 | A1 | 8/2020 | Xia | |
| 2020/0349551 | A1 | 11/2020 | Han | |

FOREIGN PATENT DOCUMENTS

| | | | | |
|---|---|---|---|---|
| CN | 104375628 | A | 2/2015 | |
| CN | 104410785 | A | 3/2015 | |
| CN | 105117256 | A | 12/2015 | |
| CN | 105759935 | A | 7/2016 | |
| CN | 105807888 | A | 7/2016 | |
| CN | 107707738 | A | 2/2018 | |
| CN | 107944325 | A | 4/2018 | |
| CN | 108989668 | A | 12/2018 | |
| CN | 109151180 | A | 1/2019 | |
| JP | 2010272998 | A | 12/2010 | |
| JP | 2015177300 | A | 10/2015 | |
| KR | 20160099435 | A | 8/2016 | |
| WO | WO-2014124663 | A1 * | 8/2014 | ........... G06F 1/1686 |
| WO | 2017129082 | A1 | 8/2017 | |
| WO | WO-2018066964 | A1 * | 4/2018 | ............... G06F 1/16 |
| WO | WO-2019009895 | A1 * | 1/2019 | ............. G06F 1/325 |
| WO | WO-2019213842 | A1 * | 11/2019 | ........... G06F 1/1626 |

OTHER PUBLICATIONS

South Korea Reasons for Refusal Office Actions related to KR Application No. 10-2020-7036650 reported on Dec. 18, 2020.
International Search Report & Written Opinion related to Application No. PCT/CN2019/084500; reported on Dec. 3, 2020.
Chinese Search Report for related Application No. 201810494006.7; reported on Nov. 9, 2020.
CN Office Action related to CN 201810494006.7 reported on Jun. 7, 2021.
European Search Report related to PCT Appliction No. PCT/CN2019/084500.

* cited by examiner

OBJECT RECOGNITION METHOD AND MOBILE TERMINAL

CROSS REFERENCE OF RELATED APPLICATION

The present application is a continuation application of PCT Application No. PCT/CN2019/084500 filed on Apr. 26, 2019, which claims a priority of Chinese patent application No. 201810494006.7 filed on May 22, 2018, which is incorporated herein by reference in its entirety.

TECHNICAL FIELD

The present disclosure relates to the field of communications technologies, and in particular, to an object identification method and a mobile terminal.

BACKGROUND

With the rapid development of mobile terminals, technologies such as face recognition and code scanning payment have become common functions in people's lives, and the functions are realized by turning on a camera of the mobile terminal and capturing information of a scan object such as a face or a two-dimensional code through the camera, so as to recognize the information of the scan object.

In the related art, when performing functions such as face recognition or code scanning payment, a user needs to perform a series of operations, and the following description will take the example of code scanning payment performed by the user. When a user performs a code scanning payment, the user firstly needs to control the mobile terminal to turn on the screen, then unlocks the mobile terminal, then opens an application program in the mobile terminal, and starts a code scanning function in the opened application program, so as to perform the code scanning payment.

Therefore, when the mobile terminal recognizes the scan object, the operation is complex.

SUMMARY

An object identification method and a mobile terminal are provided in the embodiments of the disclosure, to solve the technical issues of complex operation when the mobile terminal recognizes a scan object.

In a first aspect, an object recognition method is provided in an embodiment of the present disclosure, applied to a mobile terminal with a camera, including:

capturing a scan object through the camera in a first operating state, in a case that a screen of the mobile terminal is turned off, to obtain a first capturing result;

controlling the camera to enter a second operating state in a case that the scan object is determined to meet a preset condition according to the first capturing result, capturing the scan object through the camera in the second operating state to obtain a second capturing result, recognizing the scan object according to the second capturing result, and controlling the mobile terminal to turn on the screen to display a recognition result corresponding to the scan object;

where an operating power of the camera in the second operating state is greater than an operating power of the camera in the first operating state.

In a second aspect, a mobile terminal with a camera is further provided in an embodiment of the present disclosure, including:

a capturing module, configured to capture a scan object through the camera in a first operating state in a case that a screen of the mobile terminal is turned off, to obtain a first capturing result;

a displaying module, configured to: control the camera to enter a second operating state in a case that the scan object is determined to meet a preset condition according to the first capturing result, capture the scan object through the camera in the second operating state to obtain a second capturing result, recognize the scan object according to the second capturing result, and control the mobile terminal to turn on the screen to display a recognition result corresponding to the scan object;

where an operating power of the camera in the second operating state is greater than an operating power of the camera in the first operating state.

In a third aspect, a mobile terminal is further provided in an embodiment of the present disclosure, including: a memory, a processor and a computer program stored in the memory and executable on the processor, where the processor executes the computer program to perform the object recognition method hereinabove.

In a fourth aspect, a computer-readable storage medium is further provided in an embodiment of the present disclosure, where a computer program is stored in the computer-readable storage medium, a processor executes the computer program to perform the object recognition method hereinabove.

According to the embodiment of the present disclosure, a scan object is captured through the camera in a first operating state in a case that a screen of the mobile terminal is turned off, to obtain a first capturing result, the camera is controlled to enter a second operating state in a case that the scan object is determined to meet a preset condition according to the first capturing result, the scan object is captured through the camera in the second operating state to obtain a second capturing result, the scan object is recognized according to the second capturing result, and the mobile terminal is controlled to turn on the screen to display a recognition result corresponding to the scan object, where an operating power of the camera in the second operating state is greater than an operating power of the camera in the first operating state. Therefore, the mobile terminal may control the camera to operate in the first operating state when the screen of the mobile terminal is turned off, so that the camera may capture a scan object at any time without manually opening an application program by a user, thereby facilitating the user operation and improving the scanning efficiency.

BRIEF DESCRIPTION OF THE DRAWINGS

In order to more clearly illustrate the embodiments of the present disclosure, the drawings required to be used in the description of the embodiments of the present disclosure will be briefly introduced below, and it is apparent that the drawings in the following description are only some embodiments of the present disclosure, and it is obvious for those skilled in the art that other drawings may be obtained according to the drawings without creative work.

DETAILED DESCRIPTION

The technical solutions in the embodiments of the present disclosure will be described clearly and completely with reference to the drawings in the embodiments of the present disclosure, and it is to be understood that the described embodiments are only some embodiments, but not all embodiments, of the present disclosure. All other embodiments, which can be derived by a person skilled in the art from the embodiments disclosed herein without creative work, are intended to be within the scope of the present disclosure.

Figure 1:
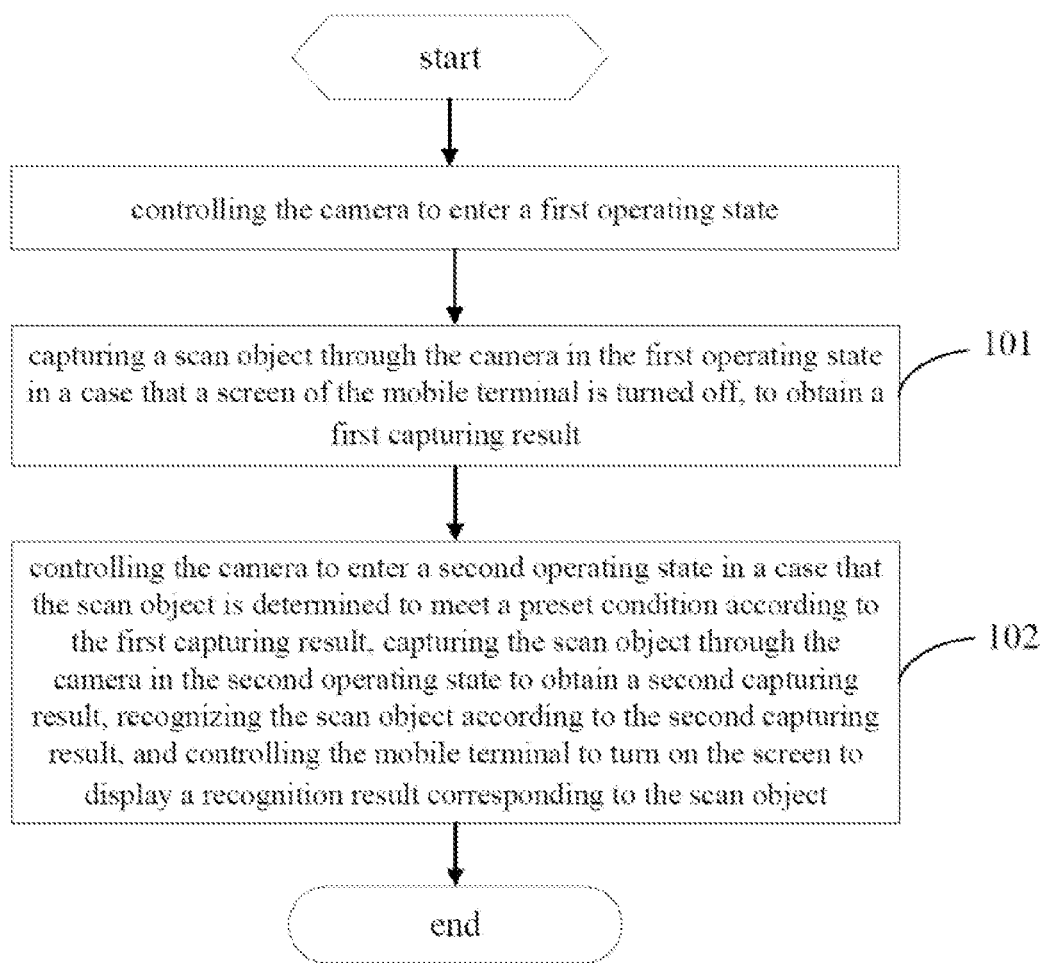
FIG. 1 is a first flowchart of an object recognition method in an embodiment of the present disclosure.

FIG. 1 is a flowchart of an object recognition method in an embodiment of the present disclosure, and as shown in FIG. 1, the object recognition method includes the following steps:

Step 101: capturing a scan object through the camera in a first operating state, in a case that a screen of the mobile terminal is turned off, to obtain a first capturing result.

The screen of the mobile terminal being turned off may be understood as a state when the mobile terminal is in an operating state and the screen does not display information. For example, the screen of the mobile terminal does not display information after the mobile terminal is locked. In this step, when the screen of the mobile terminal is turned off, the camera is in a turning-on state and operates in the first operating state.

The first operating state may be a state in which the operating power of the camera is smaller than a preset power value, for example, a low power consumption operating state in which the operating power is lower than 50 mw, 60 mw, or 100 mw. Therefore, a user can operate the mobile terminal to keep the camera to be normally turned on in the first operating state, or the mobile terminal automatically turns on the camera when the mobile terminal is powered on, and enables the camera to operate in the first operating state, namely, the camera is in a turning-on state whether the screen of the mobile terminal is turned on or turned off, so that the user may conveniently use the camera to capture a scan object at any time. In some embodiments, the camera may be controlled to be in a turning-on state only when the screen is turned off, and in a turning-off state when the screen is turned on, so that power consumption may be further saved. In addition, the first operating state may also be a state that a pixel resolution is smaller than a preset pixel resolution value, and the power consumption of the camera may be reduced because the pixel resolution in the first operating state is low.

Optionally, the first operating state is a state in which a part of pixel units of the camera are in a turning-on state, and the second operating state is a state in which all pixel units of the camera are in a turning-on state.

In the embodiment of the present disclosure, the mobile terminal may use a camera which the mobile terminal already has, and control a part of pixel units of the camera to be normally turned on in the first operating state, that is, in a case that the screen of the mobile terminal is turned off or turned on, the part of the pixel units are in a turning-on state, where one pixel unit may correspond to one pixel.

For example, for a 12 million-pixel resolution camera, in a first operating state, 300 thousand pixels are uniformly selected to operate, while the rest of pixels do not operate; for another example, a 5 M camera is enabled to operate in a low power mode with low resolution of 160×120, so as to control the camera to operate in the first operating state.

when only a part of the pixel units work, the power of the camera is smaller than a preset power value, the camera may utilize the turned-on part of the pixel units to capture a scan object at any time, the power consumption may be saved, the camera which the mobile terminal already has may be utilized, instead of arranging an additional low-power-consumption camera.

When the camera is in the first operating state, the mobile terminal can be in a screen-on state or a screen-off state, so that the camera may capture a scan object at any time without opening an application program by a user for the capturing, thereby facilitating the user operation.

The second operating state refers to that all pixel units of the camera are in a turning-on state, for example, for a 12 million-pixel resolution camera, in the second operating state, all pixel units are controlled to operate, so that a clearer image may be obtained, and the recognition rate may be improved.

Step 102: controlling the camera to enter a second operating state in a case that the scan object is determined to meet a preset condition according to the first capturing result, capturing the scan object through the camera in the second operating state to obtain a second capturing result, recognizing the scan object according to the second capturing result, and controlling the mobile terminal to turn on the screen to display a recognition result corresponding to the scan object; where an operating power of the camera in the second operating state is greater than an operating power of the camera in the first operating state.

In this step, the mobile terminal may pre-store an identification algorithm for the scan object, for example, a face algorithm, a two-dimensional code recognition algorithm, a gesture recognition algorithm, and the like, and optionally, the identification algorithm for the scan object may be stored in the camera. Therefore, after the scan object is captured through the camera, the camera may preliminarily determine whether the scan object meets the preset condition or not according to the first capturing result and the characteristics of the scan object, so that the mobile terminal is awakened to further capture and recognize the scan object in the case that the scan object meets the preset condition.

The preset condition may be a condition preset and stored by the mobile terminal. The meeting the preset condition may be understood that the scan object is a preset type, and the preset type may include a two-dimensional code, a gesture, a face and the like. In this way, the mobile terminal may further only recognize the scan object meeting the preset condition. For example, a two-dimension code recognition algorithm is integrated in the camera, and after the camera captures an image, the camera determines whether the image has the characteristics of a two-dimension code; for another example, a face recognition image is integrated in the camera, and after the camera captures an image, the camera determines whether the captured image has characteristics of a face image.

Because the pixel resolution of the image captured through the camera in the first operating state is low, the determination of whether the scan object meets the preset condition through the camera may have some errors. Therefore, in the case that the scan object is determined to meet the preset condition, the camera enters the second operating state, and the scan object is captured through the camera in the second operating state. Because the operating power in the second operating state is higher than that in the first operating state, the camera may obtain clearer images in the second operating state. The mobile terminal recognizes the scan object based on a second capturing result acquired through the camera in the second operating state, so that on one hand, the camera may be prevented from mistakenly recognizing the scan object in the first operating state; on the other hand, the specific contents of the scan object may be recognized more accurately.

Because the power of the camera in the first operating state is lower, the power consumption may be saved by capturing and recognizing the scan object through the camera in the first operating state. Therefore, the scan object meeting the preset condition is further captured to prevent the scan object from being recognized by mistake, and the specific content of the scan object or the specific information of the scan object, namely the recognition result, may be more accurately obtained, so as to display the recognition result on the screen of the mobile terminal. For example, when the camera recognizes that the scan object is a two-dimensional code, the specific content of the two-dimensional code may be further recognized as a payment two-dimensional code, so that a payment interface is displayed on the screen.

In addition, when the camera recognizes that the scan object does not meet the preset condition, the scan object is not further recognized, so the power consumption may be saved.

To facilitate understanding of the present disclosure, the following is exemplified.

The mobile terminal is provided with a rear camera, and the identification algorithm of the two-dimensional code is integrated in the rear camera. The method includes the steps that a rear camera of the mobile terminal is in a normally turned-on and low-power-consumption operating state, namely a first operating state, where the low-power-consumption operating state is a state that only a part of pixel units of the camera are in a turning-on state, and the operating power is lower than a preset power value. The normally turned-on state is the state that the camera is in a turning-on state whether the screen of the mobile terminal is turned off or turned on.

When the user needs to pay, at this moment, the screen of the mobile terminal may be turned on or turned off, and the user may put the mobile terminal's rear camera to face the payment two-dimensional code. Because rear camera is normally turned on in the low-power consumption state, and the image that contains the two-dimensional code is captured by the rear camera, and the camera further determines whether the image contains the two-dimensional code. In the case that that the camera determines that the captured image contains the two-dimensional code, the mobile terminal controls all pixel units of the camera to be in a turning-on state, and the camera enters a second operating state. The mobile terminal captures the two-dimension code image through all pixel units of the camera, further recognizes information in the two-dimension code, and displays a payment interface on a screen according to the information in the two-dimension code.

Therefore, when scanning the two-dimension code, the mobile terminal does not need the user to perform an interactive operation to scan the code, so the payment is fast. The two-dimensional code is captured and recognized through the camera in the first operating state, so the power consumption may be reduced.

In the embodiment of the present disclosure, the object identification method may be applied to a mobile terminal having a camera, for example: a Mobile phone, a Tablet Personal Computer (Tablet Personal Computer), a Laptop Computer (Laptop Computer), a Personal Digital Assistant (PDA), a Mobile Internet Device (MID), a Wearable Device (Wearable Device), or the like.

According to the embodiment of the present disclosure, a scan object is captured through the camera in a first operating state in a case that a screen of the mobile terminal is turned off, to obtain a first capturing result, the camera is controlled to enter a second operating state in a case that the scan object is determined to meet a preset condition according to the first capturing result, the scan object is captured through the camera in the second operating state to obtain a second capturing result, the scan object is recognized according to the second capturing result, and the mobile terminal is controlled to turn on the screen to display a recognition result corresponding to the scan object, where an operating power of the camera in the second operating state is greater than an operating power of the camera in the first operating state. Therefore, the mobile terminal may control the camera to operate in the first operating state when the screen of the mobile terminal is turned off, so that the camera may capture a scan object at any time without manually opening an application program by a user, thereby facilitating the user operation and improving the scanning efficiency. In addition, the recognition is performed based on the scan object captured through the camera in the second operating state, so that the recognition accuracy may be improved, and the errors may be reduced.

Figure 2:
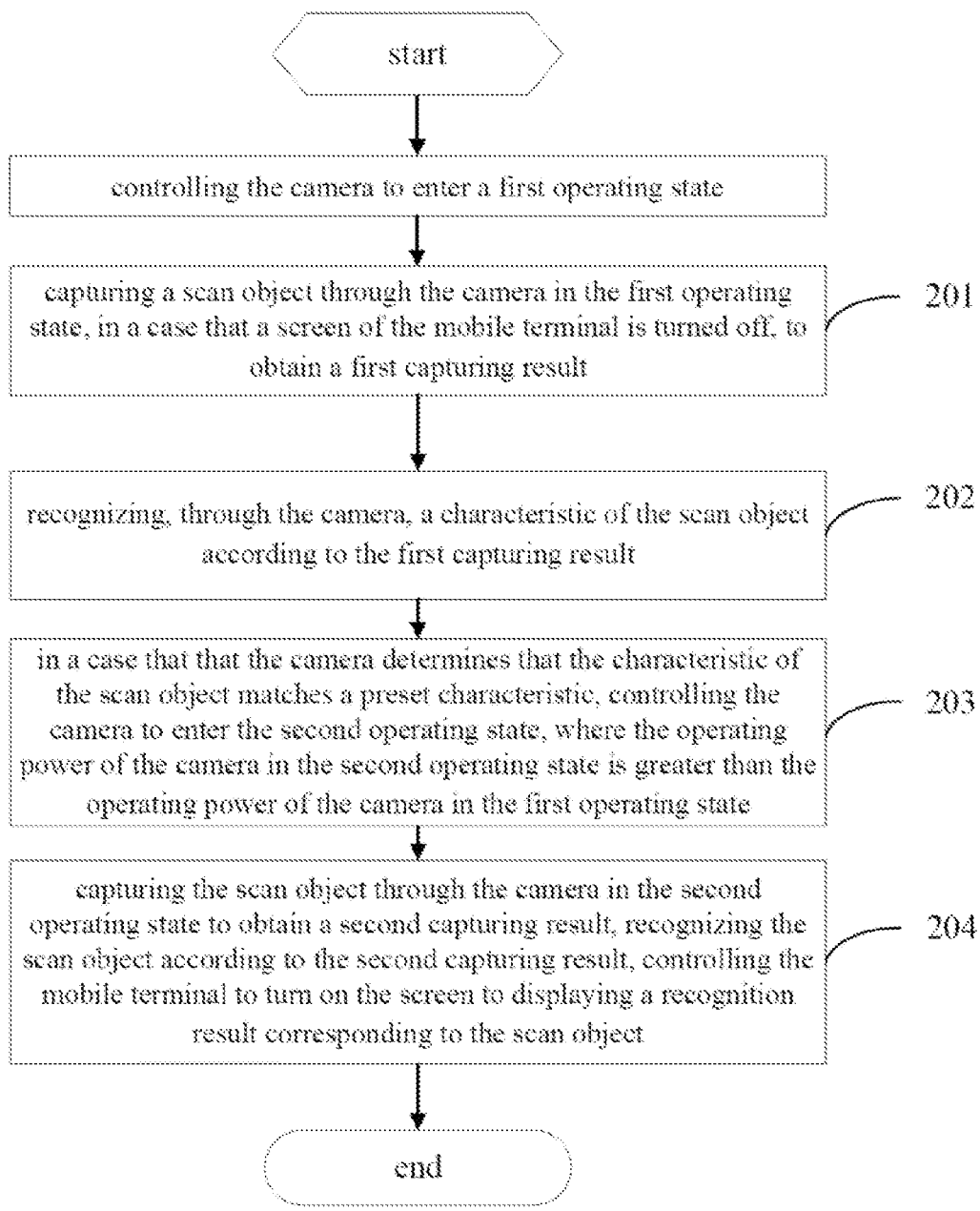
FIG. 2 is a second flowchart of an object recognition method in an embodiment of the present disclosure.

Referring to FIG. 2, the mainly difference of the present embodiment from the above embodiments is in that, in the case that the camera in the first operating state determines that the characteristic of the scan object matches the preset characteristic, the camera in the second operating state captures the scan object.

FIG. 2 is a flowchart of an object identification method in an embodiment of the present disclosure, and as shown in FIG. 2, the object identification method includes the following steps:

Step 201: capturing a scan object through the camera in a first operating state, in a case that a screen of the mobile terminal is turned off, to obtain a first capturing result.

The specific implementation manner of this step may refer to Step 101, and is not described herein again to avoid repetition.

Optionally, prior to the capturing the scan object through the camera in the first operating state in the case that the screen of the mobile terminal is turned off, the method further including: turning on the camera, and controlling the camera to enter the first operating state.

In this embodiment, the user may turn on the camera by operating the mobile terminal, or the camera may be automatically turned on when the mobile terminal is powered on.

The mobile terminal may be provided with a switching control element for switching the camera between a first operating state and a second operating state, a user may operate the switching control element to control the camera to be in the first operating state, and the user may flexibly operate according to an application scene and the state of the mobile terminal; the mobile terminal may also automatically control the camera to be in the first operating state when the mobile terminal is powered on, so as to save the power consumption of the mobile terminal and facilitate a user to operate the mobile terminal to scan the scan object. It should be noted that the embodiment can also be applied to the embodiment corresponding to FIG. 1, and the same technical effects may be achieved.

Optionally, the turning on the camera includes: in a case that the mobile terminal is powered on or the screen of the mobile terminal is turned off, turning on the camera.

In the embodiment, the mobile terminal may turn on the camera meanwhile the mobile terminal is powered on, and controls the camera to be normally turned on whether the screen is turned off or turned on, so that a user may conveniently use the camera of the mobile terminal to scan at any time. The mobile terminal may also turn on the camera when detecting that the screen of the mobile terminal is turned off, and turn off the camera when the screen of the mobile terminal is turned on, so that the power consumption may be saved, and the user may conveniently scan when the screen of the mobile terminal is turned off. It should be noted that the embodiment may also be applied to the embodiment corresponding to FIG. 1, and the same technical effects may be achieved.

Optionally, after the scan object is captured through the camera, the method further includes: in the case that the camera determines that the scan object meets the preset condition, the mobile terminal outputs prompt information.

In this embodiment, when the camera determines that the scan object meets the preset condition, the mobile terminal outputs the prompt information, specifically, the prompt information may be in a vibration or voice output manner. Therefore, when the screen of the mobile terminal is turned off, if the scan object is determined to meet the preset condition, the prompt information is output, the user does not need to adjust the position of the camera, and the user may be prompted to check the information displayed by the mobile terminal in time.

It should be noted that this embodiment can also be applied to the embodiment corresponding to FIG. 1, and the same technical effects may be achieved.

Step 202: recognizing, through the camera, a characteristic of the scan object according to the first capturing result.

The camera may integrate an identification algorithm for the scan object, such as a face recognition algorithm, a gesture recognition algorithm, a two-dimensional code recognition algorithm, and the like. After the camera captures the scan object, the characteristics of the scan object may be recognized according to the first capturing result. For example, the characteristics of the two-dimensional code may include contour characteristics, and characteristics of anchor points of the two-dimensional code; the characteristics of the face image may include characteristics of five sense organs, distribution positions thereof, and the like. The five sense organs here refers to facial features. The camera may recognize the characteristics of the scan object, so as to determine whether the scan object is a preset type of scan object.

Step 203: in a case that that the camera determines that the characteristic of the scan object matches a preset characteristic, controlling the camera to enter the second operating state. The operating power of the camera in the second operating state is greater than the operating power of the camera in the first operating state.

After the camera recognizes the characteristics of the scan object, the characteristics may be compared with preset characteristics. If the similarity between the characteristic of the scan object and the preset characteristic is greater than the preset similarity value, for example, greater than 80%, it is indicated that the characteristic of the scan object matches the preset characteristic, that is, the scan object meets the preset condition, and then the mobile terminal controls the camera to enter the second operating state.

Therefore, the scan object is preliminarily recognized through the camera in the first operating state, and the power consumption of the mobile terminal may be reduced because the operating power of the camera in the first operating state is low, thereby facilitating the user operation.

Step 204: capturing the scan object through the camera in the second operating state to obtain a second capturing result, recognizing the scan object according to the second capturing result, controlling the mobile terminal to turn on the screen to displaying a recognition result corresponding to the scan object.

The specific implementation manner of this step may refer to the relevant description in step 102, and is not described herein again.

According to the object identification method in the embodiment of the present disclosure, when the screen of the mobile terminal is turned off, a user may complete the scanning operation quickly without unlocking the mobile terminal, thereby facilitating the user operation; the camera in the first operating state is used for capturing and recognizing the scan object, so that the power consumption of the mobile terminal may be saved; and the scan object captured through the camera based on the second operating state is recognized, so that the accuracy of recognizing the scan object may be improved.

Figure 3:
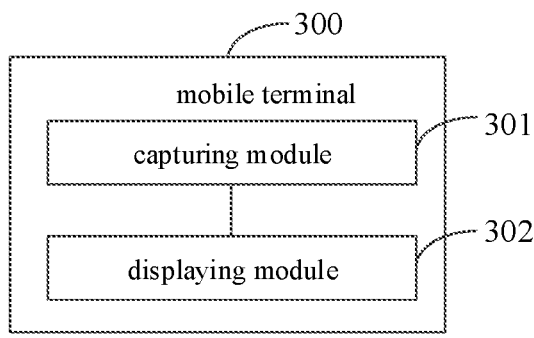
FIG. 3 is a first schematic view of a mobile terminal in an embodiment of the present disclosure.

FIG. 3 is a schematic view of a mobile terminal in an embodiment of the present disclosure, where the mobile terminal has a camera. As shown in FIG. 3, the mobile terminal 300 includes: a capturing module 301 and a displaying module 302;

the capturing module 301 is configured to capture a scan object through the camera in a first operating state in a case that a screen of the mobile terminal is turned off, to obtain a first capturing result;

the displaying module 302 is configured to: control the camera to enter a second operating state in a case that the scan object is determined to meet a preset condition according to the first capturing result, capture the scan object through the camera in the second operating state to obtain a second capturing result, recognize the scan object according to the second capturing result, and control the mobile terminal to turn on the screen to display a recognition result corresponding to the scan object;

where an operating power of the camera in the second operating state is greater than an operating power of the camera in the first operating state.

Figure 4:
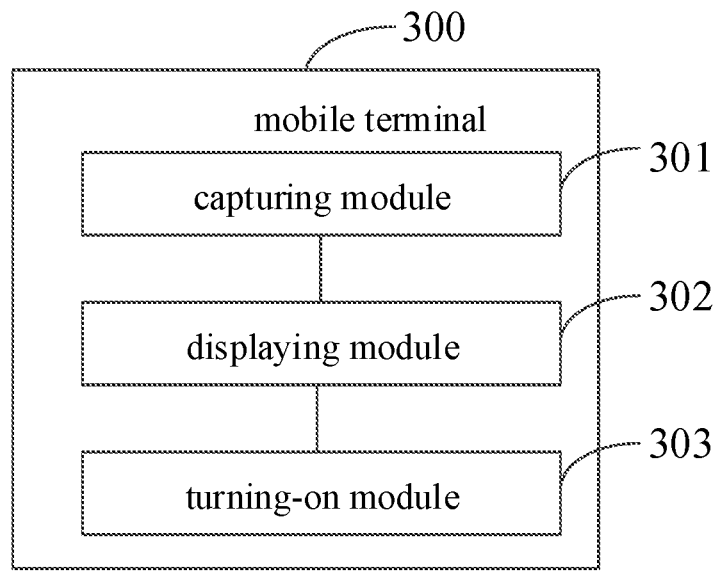
FIG. 4 is a second schematic view of a mobile terminal in an embodiment of the disclosure.

Optionally, as shown in FIG. 4, the mobile terminal further includes:

a turning-on module 303, configured to turn on the camera and control the camera to enter the first operating state.

Optionally, the turning-on module 303 is further configured to: in a case that the mobile terminal is powered on or the screen of the mobile terminal is turned off, turn on the camera.

Optionally, the first operating state is a state in which a part of pixel units of the camera are in a turning-on state, and the second operating state is a state in which all pixel units of the camera are in a turning-on state.

Figure 5:
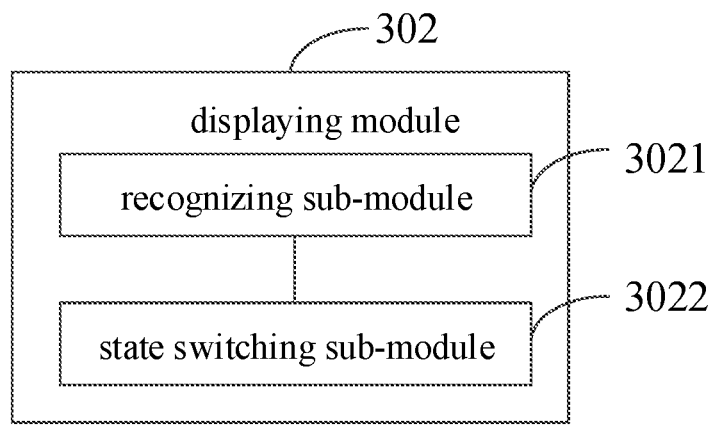
FIG. 5 is a schematic view of a displaying module in a mobile terminal in an embodiment of the present disclosure.

Optionally, as shown in FIG. 5, the displaying module 302 includes:

a recognizing sub-module 3021, configured to recognize, through the camera, a characteristic of the scan object according to the first capturing result;

a state switching sub-module 3022, configured to, in a case that that the camera determines that the characteristic of the scan object matches a preset characteristic, control the camera to enter the second operating state.

The mobile terminal 300 may implement each process implemented by the mobile terminal in the method embodiments corresponding to FIG. 1 to FIG. 2, which is not described herein again to avoid repetition.

According to the mobile terminal 300 in the embodiment of the disclosure, the mobile terminal may control the camera to be in the first operating state when the screen of the mobile terminal is turned off, so that the camera may capture a scan object at any time, an application program does not need to be manually opened by a user, thereby facilitating the user operation and improving the scanning efficiency. The scan object captured through the camera in the second operating state is recognized, so that the recognition accuracy may be improved, and the errors may be reduced.

Figure 6:
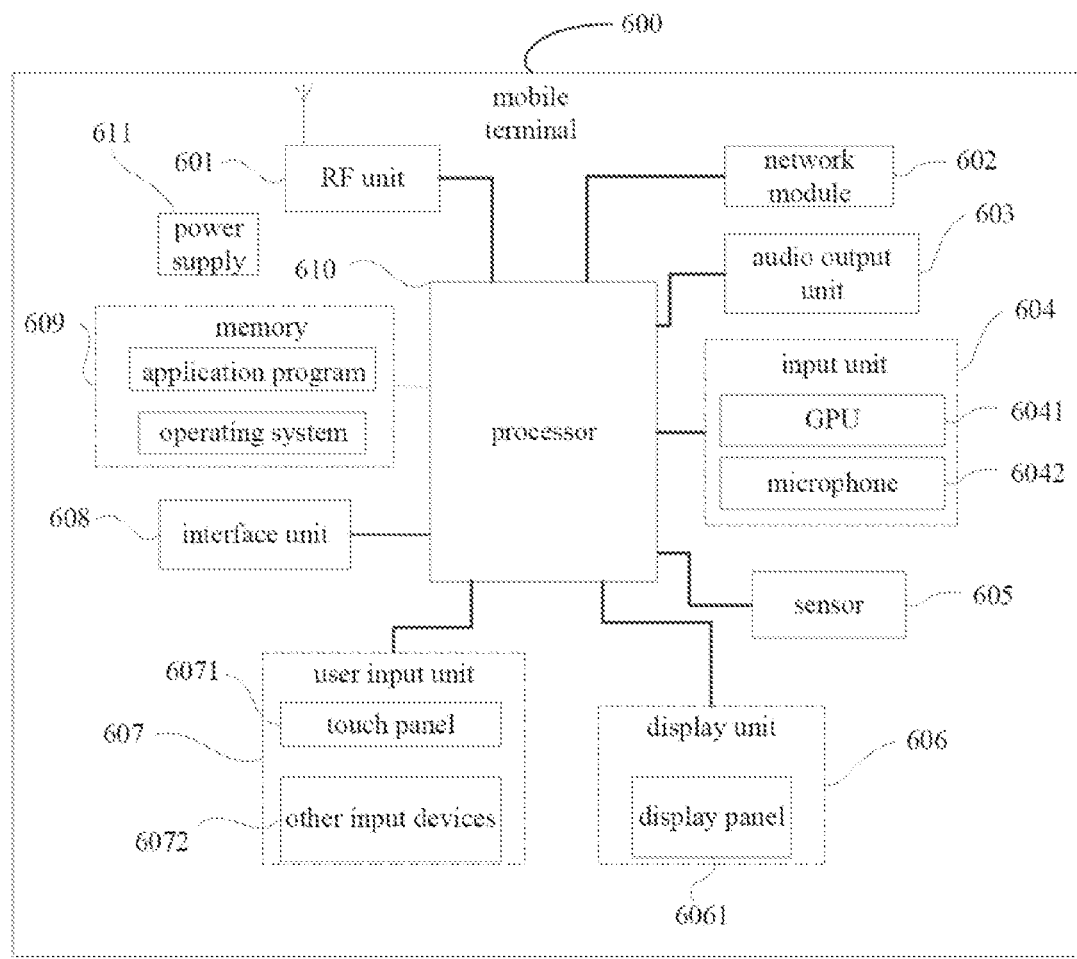
FIG. 6 is a third schematic view of a mobile terminal in an embodiment of the disclosure.

FIG. 6 is a schematic diagram of a hardware structure of a mobile terminal for implementing various embodiments of the present disclosure, where the mobile terminal 600 includes, but is not limited to: a radio frequency unit 601, a network module 602, an audio output unit 603, an input unit 604, a sensor 605, a display unit 606, a user input unit 607, an interface unit 608, a memory 609, a processor 610, and a power supply 611. Those skilled in the art will appreciate that the mobile terminal architecture illustrated in FIG. 6 is not intended to be limiting of mobile terminals, and that a mobile terminal may include more or fewer components than those illustrated, or some of the components may be combined, or a different arrangement of components. In the embodiment of the present disclosure, the mobile terminal includes, but is not limited to, a mobile phone, a tablet computer, a notebook computer, a palm computer, a vehicle-mounted mobile terminal, a wearable device, a pedometer, and the like.

The processor 610 is configured to: capture a scan object through the camera in a first operating state in a case that a screen of the mobile terminal is turned off, to obtain a first capturing result; control the camera to enter a second operating state in a case that the scan object is determined to meet a preset condition according to the first capturing result, capture the scan object through the camera in the second operating state to obtain a second capturing result, recognize the scan object according to the second capturing result, and control the mobile terminal to turn on the screen to display a recognition result corresponding to the scan object, where an operating power of the camera in the second operating state is greater than an operating power of the camera in the first operating state.

Therefore, the mobile terminal may control the camera to be in the first operating state when the screen of the mobile terminal is turned off, so that the camera may capture a scan object at any time, an application program does not need to be manually opened by a user, thereby facilitating the user operation and improving the scanning efficiency.

Optionally, the processor 610 is further configured to turn on the camera and control the camera to enter the first operating state.

Optionally, the processor 610 turning on the camera includes: in a case that the mobile terminal is powered on or the screen of the mobile terminal is turned off, turning on the camera.

Optionally, the first operating state is a state in which a part of pixel units of the camera are in a turning-on state, and the second operating state is a state in which all pixel units of the camera are in a turning-on state.

Optionally, the processor 610 controlling the camera to enter the second operating state in the case that the scan object is determined to meet the preset condition according to the first capturing result includes: recognizing, through the camera, a characteristic of the scan object according to the first capturing result; in a case that that the camera determines that the characteristic of the scan object matches a preset characteristic, controlling the camera to enter the second operating state.

It should be understood that, in the embodiment of the present disclosure, the radio frequency unit 601 may be used to receive and transmit signals during a process of sending and receiving information or a call, and specifically, receive downlink data from a base station and then process the received downlink data to the processor 610; in addition, uplink data is transmitted to the base station. Generally, radio frequency unit 601 includes, but is not limited to, an antenna, at least one amplifier, a transceiver, a coupler, a low noise amplifier, a duplexer, and the like. In addition, the radio frequency unit 601 may also communicate with a network and other devices through a wireless communication system.

The mobile terminal provides the user with wireless broadband internet access through the network module 602, such as helping the user send and receive e-mails, browse web pages, and access streaming media.

The audio output unit 603 may convert audio data received by the radio frequency unit 601 or the network module 602 or stored in the memory 609 into an audio signal and output as sound. Also, the audio output unit 603 can provide audio output (e.g., a call signal reception sound, a message reception sound, etc.) related to a specific function performed by the mobile terminal 600. The audio output unit 603 includes a speaker, a buzzer, a receiver, and the like.

The input unit 604 is used to receive audio or video signals. The input Unit 604 may include a Graphics Processing Unit (GPU) 6041 and a microphone 6042, and the Graphics processor 6041 processes image data of a still picture or video obtained by an image capturing apparatus (such as a camera) in a video capture mode or an image capture mode. The processed image frames may be displayed on the display unit 606. The image frames processed by the graphic processor 6041 may be stored in the memory 609 (or other storage medium) or transmitted via the radio frequency unit 601 or the network module 602. The microphone 6042 can receive sounds and can process such sounds into audio data. The processed audio data may be converted into a format output transmittable to a mobile communication base station via the radio frequency unit 601 in case of the phone call mode.

The mobile terminal 600 also includes at least one sensor 605, such as a light sensor, motion sensor, and other sensors. Specifically, the light sensor includes an ambient light sensor that can adjust the brightness of the display panel 6061 according to the brightness of ambient light, and a proximity sensor that can turn off the display panel 6061 and/or the backlight when the mobile terminal 600 is moved to the ear. As one of the motion sensors, the accelerometer sensor can detect the magnitude of acceleration in each direction (generally three axes), detect the magnitude and direction of gravity when stationary, and can be used to recognize the gesture of the mobile terminal (such as horizontal and vertical screen switching, related games, magnetometer gesture calibration), vibration identification related functions (such as pedometer and tapping), and the like; the sensors 605 may also include a fingerprint sensor, a pressure sensor, an iris sensor, a molecular sensor, a gyroscope, a barometer, a hygrometer, a thermometer, an infrared sensor, etc., which are not further described herein.

The display unit 606 is used to display information input by the user or information provided to the user. The Display unit 606 may include a Display panel 6061, and the Display panel 6061 may be configured in the form of a Liquid Crystal Display (LCD), an Organic Light-Emitting Diode (OLED), or the like.

The user input unit 607 may be used to receive input numeric or character information and generate key signal inputs related to user settings and function control of the mobile terminal. Specifically, the user input unit 607 includes a touch panel 6071 and other input devices 6072. Touch panel 6071, also referred to as a touch screen, may capture touch operations by a user on or near it (e.g., operations by a user on or near touch panel 6071 using a finger, stylus, or any other suitable object or attachment). The touch panel 6071 may include two portions of a touch detection device and a touch controller. The touch detection device detects the touch direction of a user, detects a signal brought by touch operation and transmits the signal to the touch controller; the touch controller receives touch information from the touch sensing device, converts the touch information into touch point coordinates, sends the touch point coordinates to the processor 610, receives a command from the processor 610, and executes the command. In addition, the touch panel 6071 can be implemented by various types such as a resistive type, a capacitive type, an infrared ray, and a surface acoustic wave. The user input unit 607 may include other input devices 6072 in addition to the touch panel 6071. Specifically, the other input devices 6072 may include, but are not limited to, a physical keyboard, function keys (such as volume control keys, switch keys, etc.), a trackball, a mouse, and a joystick, which are not described herein again.

Further, the touch panel 6071 can be overlaid on the display panel 6061, and when the touch panel 6071 detects a touch operation thereon or nearby, the touch operation can be transmitted to the processor 610 to determine the type of the touch event, and then the processor 610 can provide a corresponding visual output on the display panel 6061 according to the type of the touch event. Although in FIG. 6, the touch panel 6071 and the display panel 6061 are two independent components to realize the input and output functions of the mobile terminal, in some embodiments, the touch panel 6071 and the display panel 6061 may be integrated to realize the input and output functions of the mobile terminal, which is not limited herein.

The interface unit 608 is an interface through which an external device is connected to the mobile terminal 600. For example, the external device may include a wired or wireless headset port, an external power supply (or battery charger) port, a wired or wireless data port, a memory card port, a port for connecting a device having an identification module, an audio input/output (I/O) port, a video I/O port, an earphone port, and the like. The interface unit 608 may be used to receive input (e.g., data information, power, etc.) from external devices and transmit the received input to one or more elements within the mobile terminal 600 or may be used to transmit data between the mobile terminal 600 and external devices.

The memory 609 may be used to store software programs as well as various data. The memory 609 may mainly include a program storage area and a data storage area, where the program storage area may store an operating system, an application program required for at least one function (such as a sound playing function, an image playing function, etc.), and the like; the storage data area may store data (such as audio data, a phonebook, etc.) created according to the use of the cellular phone, etc. Further, the memory 609 may include high speed random access memory, and may also include non-volatile memory, such as at least one magnetic disk storage device, flash memory device, or other volatile solid state storage device.

The processor 610 is a control center of the mobile terminal, connects various parts of the entire mobile terminal using various interfaces and lines, performs various functions of the mobile terminal and processes data by operating or executing software programs and/or modules stored in the memory 609 and calling data stored in the memory 609, thereby integrally monitoring the mobile terminal. Processor 610 may include one or more processing units; optionally, the processor 610 may integrate an application processor and a modem processor, where the application processor mainly handles operating systems, user interfaces, application programs, and the like, and the modem processor mainly handles wireless communications. It will be appreciated that the modem processor described above may not be integrated into the processor 610.

The mobile terminal 600 may also include a power supply 611 (e.g., a battery) for powering the various components, and optionally, the power supply 611 may be logically coupled to the processor 610 via a power management system that is configured to manage charging, discharging, and power consumption.

In addition, the mobile terminal 600 includes some functional modules that are not shown, and are not described in detail herein.

Optionally, a mobile terminal is further provided in an embodiment of the present disclosure, including: a memory 609, a processor 610 and a computer program stored in the memory 609 and executable on the processor 610, where the processor 610 executes the computer program to perform the object recognition method hereinabove, and can achieve the same technical effect, and in order to avoid repetition, details thereof are not repeated here.

Optionally, a computer-readable storage medium is further provided in an embodiment of the present disclosure, where a computer program is stored in the computer-readable storage medium, a processor executes the computer program to perform the object recognition method hereinabove, and can achieve the same technical effects, and in order to avoid repetition, and in order to avoid repetition, details thereof are not repeated here. The computer-readable storage medium may be a Read-Only Memory (ROM), a Random Access Memory (RAM), a magnetic disk or an optical disk.

It should be noted that, in this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element recognized by the phrase "including an . . . ." does not exclude the presence of other identical elements in the process, method, article, or apparatus that includes the element.

Through the description of the foregoing embodiments, it is clear to those skilled in the art that the method of the foregoing embodiments may be implemented by software plus a necessary general hardware platform, and certainly may also be implemented by hardware, but in many cases, the former is a better implementation. Based on such understanding, the technical solutions of the present disclosure may be embodied in the form of a software product, which is stored in a storage medium (such as a ROM/RAM, a magnetic disk, and an optical disk), and includes several instructions for enabling a mobile terminal (which may be a mobile phone, a computer, a server, an air conditioner, or a network device) to perform the methods according to the embodiments of the present disclosure.

While the embodiments of the present disclosure have been described in conjunction with the drawings, the present disclosure is not limited to the embodiments, which have been described above for illustrative purposes only and not for purposes of limitation, and it will be appreciated by those of ordinary skill in the art that, in light of the present disclosure, numerous modifications may be made without departing from the spirit of the disclosure and scope of the appended claims.

What is claimed is:

1. An object recognition method, applied to a mobile terminal with a camera, comprising:
    capturing a scan object through the camera in a first operating state, in a case that a screen of the mobile terminal is turned off, to obtain a first capturing result;
    controlling the camera to enter a second operating state in a case that the scan object is determined to meet a preset condition according to the first capturing result, capturing the scan object through the camera in the second operating state to obtain a second capturing result, recognizing the scan object according to the second capturing result, and controlling the mobile terminal to turn on the screen to display a recognition result corresponding to the scan object;
    wherein an operating power of the camera in the second operating state is greater than an operating power of the camera in the first operating state;
    wherein prior to the capturing the scan object through the camera in the first operating state in the case that the screen of the mobile terminal is turned off, the method further comprises:
    turning on the camera, and controlling the camera to enter the first operating state;
    wherein the turning on the camera comprises:
    detecting a turning-off or a turning-on operation on the screen of the mobile terminal;
    turning on the camera in response to turning off the screen of the mobile terminal;
    the object recognition method further comprises:
    turning off the camera in response to turning on the screen of the mobile terminal.

2. The method according to claim 1, wherein the first operating state is a state in which a part of pixel units of the camera are in a turning-on state, and the second operating state is a state in which all pixel units of the camera are in a turning-on state.

3. The method according to claim 1, wherein the controlling the camera to enter the second operating state in the case that the scan object is determined to meet the preset condition according to the first capturing result comprises:
    recognizing, through the camera, a characteristic of the scan object according to the first capturing result;
    in a case that that the camera determines that the characteristic of the scan object matches a preset characteristic, controlling the camera to enter the second operating state.

4. A mobile terminal with a camera, comprising: a memory, a processor and a computer program stored in the memory and executable on the processor, wherein the processor executes the computer program to:
    capture a scan object through the camera in a first operating state in a case that a screen of the mobile terminal is turned off, to obtain a first capturing result;
    control the camera to enter a second operating state in a case that the scan object is determined to meet a preset condition according to the first capturing result, capture the scan object through the camera in the second operating state to obtain a second capturing result, recognize the scan object according to the second capturing result, and control the mobile terminal to turn on the screen to display a recognition result corresponding to the scan object;
    wherein an operating power of the camera in the second operating state is greater than an operating power of the camera in the first operating state;
    wherein the processor executes the computer program to:
    turn on the camera and control the camera to enter the first operating state;
    wherein the processor executes the computer program to:
    detect a turning-off or a turning-on operation on the screen of the mobile terminal;
    turn on the camera in response to turning off the screen of the mobile terminal;
    wherein the processor executes the computer program to:
    turn off the camera in to turning on the screen of the mobile terminal.

5. The mobile terminal according to claim 4, wherein the first operating state is a state in which a part of pixel units of the camera are in a turning-on state, and the second operating state is a state in which all pixel units of the camera are in a turning-on state.

6. The mobile terminal according to claim 4, wherein the processor executes the computer program to:
    recognize, through the camera, a characteristic of the scan object according to the first capturing result;
    in a case that that the camera determines that the characteristic of the scan object matches a preset characteristic, control the camera to enter the second operating state.

7. A non-transitory computer-readable storage medium, wherein a computer program is stored in the computer-readable storage medium, a processor executes the computer program to perform the object recognition method according to claim 1.

* * * * *